(12) United States Patent
Shishido et al.

(10) Patent No.: US 7,492,549 B2
(45) Date of Patent: Feb. 17, 2009

(54) AUTOMATIC BALANCING DEVICE, ROTATIONAL DRIVING DEVICE AND DISK DRIVE

(75) Inventors: Yuji Shishido, Kanagawa (JP); Takashi Mochida, Chiba (JP)

(73) Assignee: Sony Corporation (JP)

( * ) Notice: Subject to any disclaimer, the term of this patent is extended or adjusted under 35 U.S.C. 154(b) by 367 days.

(21) Appl. No.: 11/264,135

(22) Filed: Nov. 2, 2005

(65) Prior Publication Data
US 2006/0109587 A1      May 25, 2006

(30) Foreign Application Priority Data
Nov. 22, 2004  (JP) .............................. 2004-336908

(51) Int. Cl.
G11B 23/00        (2006.01)
(52) U.S. Cl. .................................. 360/99.08
(58) Field of Classification Search .......... 720/701–702
See application file for complete search history.

(56) References Cited

U.S. PATENT DOCUMENTS

| 6,205,110 B1 * | 3/2001 | Miyamoto et al. ........... 369/266 |
| 6,295,269 B1 * | 9/2001 | Takeuchi et al. ............ 720/701 |
| 6,452,896 B1 * | 9/2002 | Song .......................... 720/702 |
| 6,606,922 B2 * | 8/2003 | Case et al. ................... 464/180 |
| 2001/0000312 A1 * | 4/2001 | Kume et al. ................. 369/263 |

FOREIGN PATENT DOCUMENTS
JP          04-312244          11/1992

* cited by examiner

*Primary Examiner*—Mark Blouin
(74) *Attorney, Agent, or Firm*—Rader Fishman & Grauer PLLC; Ronald P. Kananen

(57) ABSTRACT

Disclosed herein is an automatic balancing device including a balancer made of a magnetic fluid, a rotatable enclosure having an outer circumferential wall and accommodating the balancer, a magnet provided near at least the center of rotation of the enclosure so as to be rotatable integrally with the enclosure, and a platelike projection projecting from the outer circumferential wall toward the center of rotation of the enclosure, at least a part of the platelike projection extending in a direction different from a radial direction of the enclosure at the juncture between the platelike projection and the outer circumferential wall.

7 Claims, 7 Drawing Sheets

AUTOMATIC BALANCING DEVICE, ROTATIONAL DRIVING DEVICE AND DISK DRIVE

CROSS REFERENCES TO RELATED APPLICATIONS

The present invention contains subject matter related to Japanese Patent Application 2004-336908 filed with the Japanese Patent Office on Nov. 22, 2004, the entire contents of which are incorporated herein by reference.

BACKGROUND OF THE INVENTION

The present invention relates to an automatic balancing device for maintaining rotational balance, a rotational driving device including the automatic balancing device, and a disk drive including the rotational driving device.

In recent disk drives for recording/reproducing data, such as an optical disk drive and a magnetic disk drive, there is a case in which when a disk placed on a turntable is rotated, the rotational balance of the disk may be lost and cause a reduction in the stability of recording/reproduction.

As a technique for improving the rotational balance of the disk, there has been disclosed a technique such that a ring-like member having a hollow portion for accommodating a magnetic fluid is provided on a rotating shaft of a motor so as to be rotatable integrally with the rotating shaft. The ring-like member has a central boss portion, and a ring magnet is provided on the outer circumferential surface of the boss portion. The motor is supported to a subchassis, which is supported through an elastic member to a main chassis. With this structure, magnetic fluid is magnetically attracted to the ring magnet at low rotational speeds of the motor, thereby maintaining the rotational balance. When the rotational speed of the motor increases and a centrifugal force due to the rotation of the ring-like member accordingly increases accordingly, the magnetic fluid is moved toward the outer circumference of the ring-like member, for example, so as to maintain the rotational balance (see Japanese Patent Laid-open No. 4-312244, Column [0006] and FIG. 1, for example).

In the related art cited above, however, the distance between the ring magnet and the magnetic fluid staying at a lower portion of the ring-like member is large when the disk drive is used in its vertical position, i.e., in the condition where the recording surface of the disk is perpendicular to a horizontal plane. Accordingly, it is difficult to return and retain the magnetic fluid to the ring magnet in such a vertical position. As a result, there arises a problem that it is difficult to maintain the rotational balance of the disk, depending upon the position of the disk. Further, there arises another problem that the magnetic fluid is moved by the centrifugal force in a direction substantially opposite to the direction of deviation of the center of rotation of the disk, causing a flow of the magnetic fluid along the outer circumference of the ring-like member. As a result, the deviation of the magnetic fluid is lost and it is accordingly difficult to greatly improve the rotational balance with a small amplitude of oscillation.

SUMMARY OF THE INVENTION

Accordingly, it is a desire of the present invention to provide an automatic balancing device, a rotational driving device, and a disk drive which can improve the rotational balance of the disk irrespective of the position of the disk.

It is another desire of the present invention to provide an automatic balancing device, a rotational driving device, and a disk drive which can reliably return the magnetic fluid as a balancer to a predetermined position when the rotational speed of the disk is reduced to a predetermined speed or zero.

In accordance with a first aspect of the present invention, there is provided an automatic balancing device including a balancer made of a magnetic fluid; a rotatable enclosure having an outer circumferential wall and accommodating the balancer; a magnet provided near at least the center of rotation of the enclosure so as to be rotatable integrally with the enclosure; and a plate-like projection projecting from the outer circumferential wall toward the center of rotation of the enclosure, with at least a part of the plate-like projection extending in a direction different from a radial direction of the enclosure at the juncture between the plate-like projection and the outer circumferential wall.

According to the first aspect, the plate-like projection projects from the outer circumferential wall of the enclosure toward the center of the enclosure, so that it is possible to prevent the flow of the balancer along the outer circumference of the enclosure during the rotation of the enclosure. Accordingly, even when the amplitude of oscillation of the disk during the rotation is relatively small, a balanced condition can be provided by the balancer locally collected in the enclosure by the plate-like projection. Further, according to the first aspect, at least a part of the plate-like projection extends in a direction different from the radial direction of the enclosure at the juncture between the plate-like projection and the outer circumferential wall. Accordingly, in the case in which the axis of rotation of the enclosure is kept in position substantially parallel to a horizontal plane (which position will be hereinafter referred to as the vertical position of the enclosure) and the rotational speed of the enclosure is gradually reduced in ending the operation of the automatic balancing device, the following effect can be obtained. By utilizing the inertia of rotation of the enclosure lowering in rotational speed, the balancer is raised to a predetermined level by the platelike projection as in a waterwheel, and the balancer then falls from this predetermined level due to its own weight down to the magnet located near the center of the enclosure. Thus, the balancer can be returned to the original position on the magnet and can be retained to the magnet.

In this case, however, the direction of extension of the plate-like projection from the outer circumferential wall or the angle of projection of the plate-like projection from the outer circumferential wall at the juncture therebetween must be suitably set. For example, the platelike projection has a front end which becomes a most advanced end in respect of the rotation of the enclosure. With this configuration, the balancer is raised to a level higher than the center of rotation of the enclosure by the plate-like projection, so that the balancer falling due to its own weight can be easily returned to the original position on the magnet.

The wording of "at least a part of the plate-like projection" is intended to mean that all of the plate-like projection does not necessarily extend in a direction different from the radial direction of the enclosure, but a part of the plate-like projection essentially extends in a direction different from the radial direction of the enclosure.

Preferably, the plate-like projection extends straight from the outer circumferential wall toward the center of rotation of the enclosure.

As a modification, the plate-like projection may extend arcuately from the outer circumferential wall toward the center of rotation of the enclosure. In particular, the plate-like projection is curved in the same direction as the direction of rotation of the enclosure, so that the balancer can be raised to a higher level in the vertical position of the automatic balancing device to thereby reliably return the balancer to the original position.

Preferably, the plate-like projection has a front end present radially inside of the outer circumferential wall, the magnet has an annular shape substantially coaxial with the enclosure, and the length of a first straight line from the outer circumferential wall to the front end of the platelike projection is set so that a part of a second straight line orthogonal to the first straight line at the front end in a plane substantially perpendicular to the axis of rotation of the enclosure passes through the magnet at a position radially inside of the outer circumference of the magnet. With this configuration, the distance between the front end of the plate-like projection and the magnet can be reduced to thereby return the balancer to the magnet more reliably. In this case, the plate-like projection may be straight or arcuate, and it is sufficient that the magnet be annular in shape as a whole. That is, the annular magnet may be partially cut away or discontinued.

Preferably, the plate-like projection includes a first plate-like projection projecting at a first angle from the outer circumferential wall toward the center of the enclosure and a second plate-like projection projecting at a second angle different from the first angle from the outer circumferential wall toward the center of the enclosure. With this configuration, the balancer can be returned to the original position irrespective of the angle of the enclosure in the vertical position thereof. The first and second angles are those formed at the juncture between the plate-like projection and the outer circumferential wall as viewed in a plane substantially perpendicular to the axis of rotation of the enclosure. Accordingly, the first and second plate-like projections may be straight or arcuate.

Preferably, the plate-like projection has a curved surface continuing to the outer circumferential wall at the juncture between the plate-like projection and the outer circumferential wall. The acuter the angle formed between the plate-like projection and the outer circumferential wall, the larger the force of attracting the balancer between the plate-like projection and the outer circumferential wall due to the surface tension of the balancer. According to the above configuration, no angle is formed between the plate-like projection and the outer circumferential wall, but the curved surface is formed to smoothly connect the plate-like projection and the outer circumferential wall, thereby reducing the force of attracting the balancer between the plate-like projection and the outer circumferential wall. As a result, the balancer can be efficiently returned to the original position without being left between the plate-like projection and the outer circumferential wall.

Preferably, the enclosure has a passage for the balancer, the passage having an inclined surface gradually lowering in level from the outer circumferential side of the enclosure toward the center thereof in the condition where the axis of rotation of the enclosure is substantially perpendicular to a horizontal plane. This configuration is effective in the case that the automatic balancing device is kept in position so that the axis of rotation of the enclosure is substantially perpendicular to a horizontal plane (which position will be hereinafter referred to as the horizontal position of the enclosure). Accordingly, even when the automatic balancing device is in a horizontal position, the balancer can be moved from the outer circumferential side of the enclosure toward the center thereof due to its own weight by the passage having the inclined surface mentioned above, thus returning the balancer to the magnet.

In accordance with a second aspect of the present invention, there is provided a rotational driving device including a rotational drive section, a balancer made of a magnetic fluid, an enclosure having an outer circumferential wall and accommodating the balancer, the enclosure being rotatable by the rotational drive section, a magnet provided near at least the center of rotation of the enclosure so as to be rotatable integrally with the enclosure, and a plate-like projection projecting from the outer circumferential wall toward the center of rotation of the enclosure, with at least a part of the plate-like projection extending in a direction different from a radial direction of the enclosure at the juncture between the plate-like projection and the outer circumferential wall.

According to the second aspect, the plate-like projection projects from the outer circumferential wall of the enclosure toward the center of the enclosure, so that it is possible to prevent the flow of the balancer along the outer circumference of the enclosure during the rotation of the enclosure, and a balanced condition can be provided by the balancer locally collected in the enclosure by the plate-like projection. Further, according to the second aspect, at least a part of the plate-like projection extends in a direction different from the radial direction of the enclosure at the juncture between the plate-like projection and the outer circumferential wall. Accordingly, in the case in which the enclosure is kept in its vertical position and the rotational speed of the enclosure is gradually reduced in ending the operation of the rotational driving device, the balancer can be reliably returned to the magnet.

In accordance with a third aspect of the present invention, there is provided a disk drive including the rotational drive section for rotating a disk a balancer made of a magnetic fluid, an enclosure having an outer circumferential wall and accommodating the balancer, the enclosure being rotatable by the rotational drive section, a magnet provided near at least the center of rotation of the enclosure so as to be rotatable integrally with the enclosure, a plate-like projection projecting from the outer circumferential wall toward the center of rotation of the enclosure, at least a part of the plate-like projection extending in a direction different from a radial direction of the enclosure at the juncture between the plate-like projection and the outer circumferential wall, and a control section for controlling the rotational drive section to rotate the enclosure immediately before loading the disk or immediately after ejecting the disk.

In this configuration, the rotational speed of the rotational drive section to be controlled by the control section may be set lower than the rotational speed in recording a signal to the disk or reproducing a signal from the disk. For example, in the case in which the disk drive is kept in position so that the signal recording surface of the disk is perpendicular to a horizontal plane, the enclosure may be rotated at a speed of 200 rpm or less or 100 rpm or less, for example, thereby allowing the return of the balancer to the magnet due to its own weight. The control section may be provided by hardware or firmware, for example.

According to the present invention, the following effects can be obtained. The rotational balance of the disk can be improved irrespective of the position of the disk. Further, the balancer can be reliably returned to the magnet as the original position when the rotational speed of the disk is reduced to a predetermined speed or zero.

Other objects and features of the invention will be more fully understood from the following detailed description and appended claims when taken with the accompanying drawings.

DETAILED DESCRIPTION OF THE PREFERRED EMBODIMENTS

Some preferred embodiments of the present invention will now be described with reference to the drawings.

Figure 1:
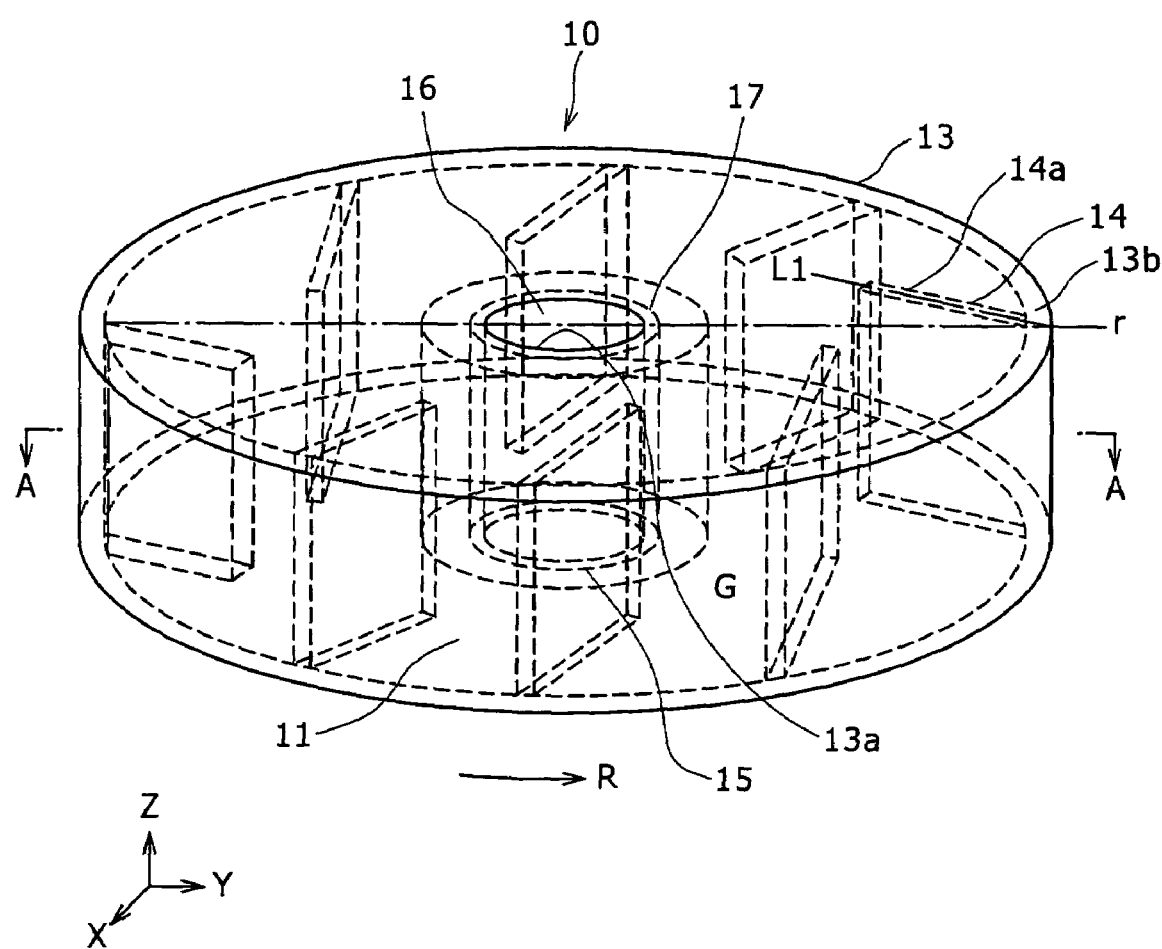
FIG. 1 is a schematic perspective view of an automatic balancing device according to a first preferred embodiment of the present invention.
Figure 2:
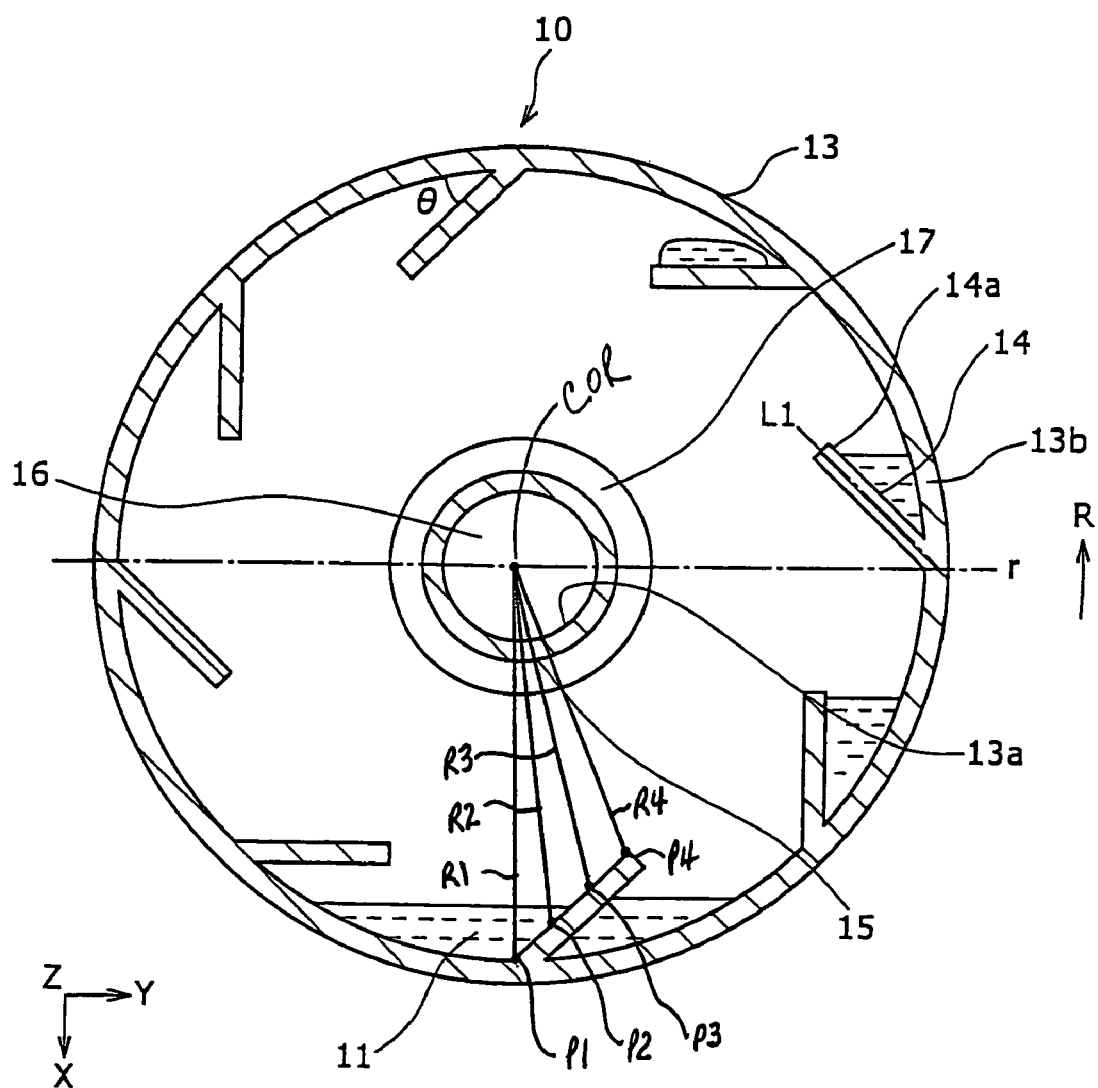
FIG. 2 is a cross section taken along the line A-A in FIG. 1.
Figure 3:
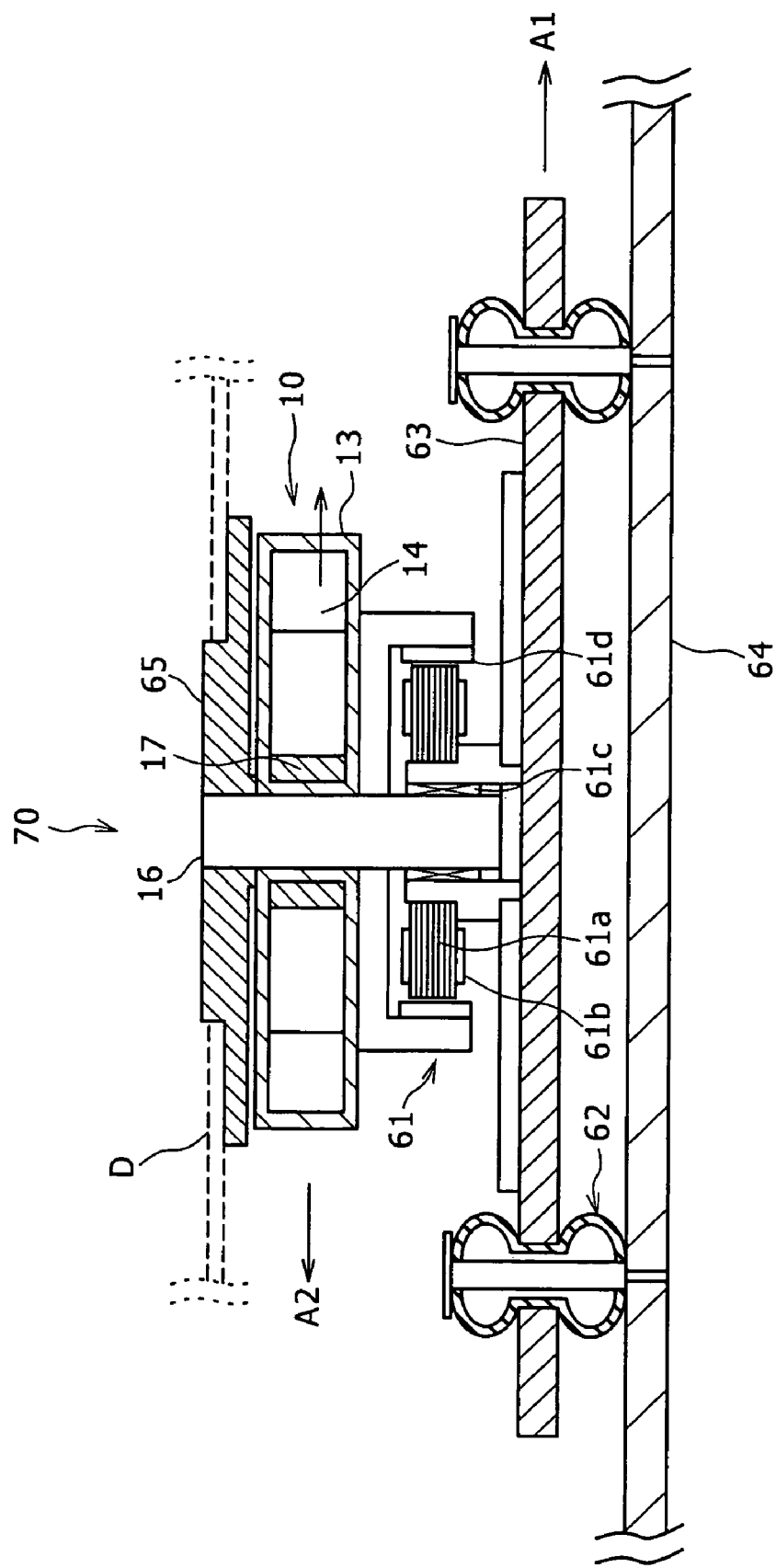
FIG. 3 is a vertical sectional view of a disk drive including the automatic balancing device shown in FIG. 1.

FIG. 1 is a schematic perspective view of an automatic balancing device 10 according to a first preferred embodiment of the present invention, and FIG. 2 is a cross sectional view taken along the line A-A in FIG. 1. FIG. 3 is a vertical sectional view of a disk drive 70 including the automatic balancing device 10 shown in FIG. 1.

As shown in FIGS. 1 and 2, the automatic balancing device 10 includes a balancer 11 made of a magnetic fluid, a rotatable enclosure 13 having an outer circumferential wall 13b and accommodating the balancer 11, a magnet 17 provided near the center of rotation of the enclosure 13 so as to be rotatable integrally with the enclosure 13, and a plurality of plate-like projections 14 projecting from the outer circumferential wall 13b toward the center of rotation of the enclosure 13.

The enclosure 13 has a ring-like structure with a hollow portion G for accommodation of the balancer 11 and a central hole 13a for insertion of a rotating shaft 16 of a motor 61 shown in FIG. 3. The enclosure 13 is formed of metal or resin, for example.

Each plate-like projection 14 extends straight in a direction of line L1 different from a radial direction r of the enclosure 13 at the juncture between the plate-like projection 14 and the outer circumferential wall 13b. More specifically, each plate-like projection 14 is inclined at an angle θ with respect to the outer circumferential wall 13b so as to have a front end 14a which becomes a most advanced end in respect of the rotation of the enclosure 13 in a direction of arrow R. The angle θ of inclination of each plate-like projection 14 is set to 10° to 80°, for example. Each plate-like projection 14 has a height substantially equal to the height of the enclosure 13 in a Z direction as viewed in FIG. 1.

The enclosure 13 further has an inner circumferential wall 15 substantially about the center of rotation of the enclosure 13 so as to define the central hole 13a. The magnet 17 has an annular shape so as to surround the inner circumferential wall 15. The magnet 17 is polarized in the Z direction, for example. In other words, the magnet 17 is polarized so that one end of the magnet 17 in the Z direction is a N pole and the other end of the magnet 17 in the Z direction is a S pole. The magnet 17 is capable of retaining the balancer 11 near the center of the enclosure 13 when the disk drive 70 is not in operation or it is operated at low rotational speeds of the motor 61 in an initial stage of the operation, for example.

The balancer 11 is accommodated in the hollow portion G of the enclosure 13. Examples of the magnetic fluid as the balancer 11 include a Ferro fluid (trade mark of IBM company), MR fluid (Magneto-Rheological Fluid), and magnetic ion liquid.

As shown in FIG. 3, the disk drive 70 includes the motor 61, and a turntable 65 for placing a recording medium D such as an optical disk thereon is mounted on the rotating shaft 16 of the motor 61 at an upper end portion thereof. The motor 61 includes a stator 61a having a coil 61b through which a drive current is passed, the rotating shaft 16 rotatably supported through a bearing 61c to the stator 61a, and a rotor 61d fixed to the rotating shaft 16. The automatic balancing device 10 is fixedly mounted on the rotating shaft 16 so as to be rotatable integrally with the rotating shaft 16.

Although not shown, a traverse module including an optical pickup for recording/reproducing information to/from the disk D and a thread motor for moving the optical pickup in the radial direction of the disk D is provided on a subchassis 63. The motor 61 is supported to the subchassis 63, and the subchassis 63 is supported through a elastic section 62 to a main chassis 64, thereby configuring an oscillating system. The elastic section 62 is composed mainly of a high-molecular material, such as rubber, and a metallic member. Further, a loading module (not shown) including a loading motor for loading/ejecting the disk D is provided on the main chassis 64.

The resonance frequency of the oscillating system by the deformation of the elastic section 62 is set lower than the rotational frequency of the disk D with the mass of the traverse module and the spring constant of the elastic section 62 being used as parameters.

The operation of the automatic balancing device 10 will now be described.

When the disk D is placed on the turntable 65 and the motor 61 starts to be operated, the oscillating system starts to oscillate. At low rotational speeds of the motor 61, the magnetic force of the magnet 17 for retaining the balancer 11 is larger than a centrifugal force acting on the automatic balancing device 10. Thus, the balancer 11 is retained by the magnet 17 at low rotational speeds of the motor 61.

When the rotational speed of the motor 61 increases and its rotational frequency becomes higher than the resonance frequency of the oscillating system, the direction A1 of oscillation of the oscillating system becomes substantially opposite to the direction A2 of deviation of the disk D from the center of rotation. At this time, the balancer 11 is moved at an acceleration by the oscillation of the oscillating system in the above direction A1. Accordingly, the direction (A1) of movement of the balancer 11 is opposite to the direction A2 of deviation of the disk D, thereby obtaining a balanced condition. It is therefore preferable to set the rotational speed of the motor 61 (e.g., rotational speed in reproducing a signal recorded on the disk D) and the material of the elastic section 62 so that the directions A1 and A2 become substantially opposite to each other. The automatic balancing device 10 is effective for use with the motor 61 or a spindle motor for an optical disk drive wherein the amount of imbalance is unknown in every operation.

When the rotational speed of the motor 61 further increases, the centrifugal force becomes larger than the magnetic force of the magnet 17 for retaining the balancer 11, so that the balancer 11 is moved away from the magnet 17 by the centrifugal force. The movement of the balancer 11 is blocked by the enclosure 13. More specifically, since the platelike projections 14 project from the outer circumferential wall 13*b* of the enclosure 13 toward the center of the enclosure 13, the circumferential flow of the balancer 11 along the outer circumferential wall 13*b* can be blocked by the plate-like projections 14 during the rotation of the enclosure 13. Accordingly, even when the amplitude of oscillation of the disk D during the rotation thereof is relatively small, a balanced condition can be obtained by the balancer 11 locally collected in the enclosure 13 by the plate-like projections 14.

When signal recording/reproduction to/from the disk D is ended in the condition that the axis of rotation of the central hole 13*a* of the enclosure 13 is substantially parallel to the horizontal plane (which condition will be hereinafter referred to as a vertical position of the automatic balancing device), the rotational speed of the enclosure 13 gradually decreases in the disk drive 70 to inertially rotate. Each plate-like projection 14 projects along the line L1 inclined with respect to the radial direction r so that the front end 14*a* becomes a most advanced end during the rotation of the enclosure 13. Accordingly, the balancer 11 is lifted to a given position by each plate-like projection 14 by utilizing the inertia of rotation of the enclosure 13 lowering in rotational speed. Thereafter, the balancer 11 falls from this given position due to its own weight, so that the balancer 11 can be retained by the magnet 17. Thus, the balancer 11 can be reliably returned to its original position on the magnet 17.

The automatic balancing device 10 is suitable especially for an optical disk drive for a vertically installable type personal computer in which the vertical position is frequently adopted or for an optical-disk drive type camera in which the operational position is not limited.

Figure 4:
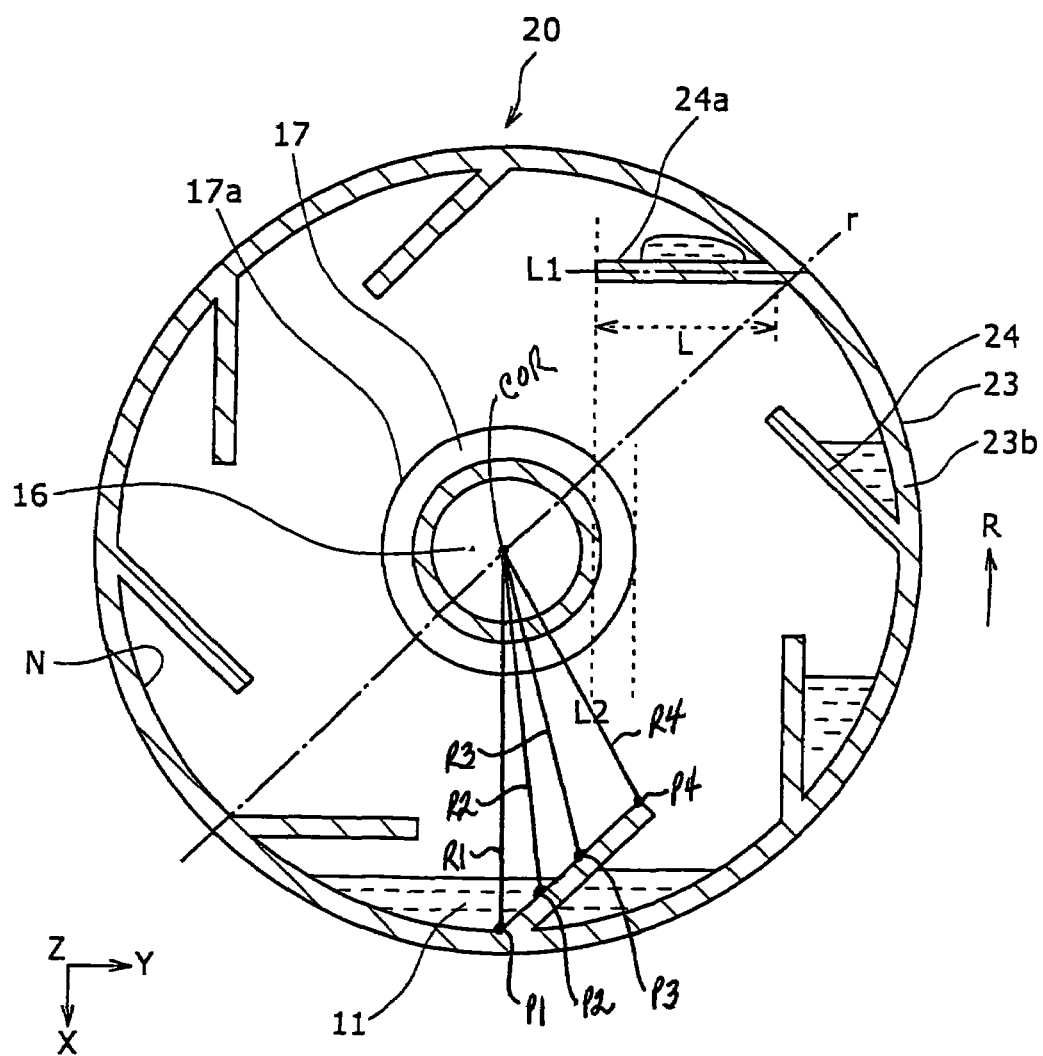
FIG. 4 is a sectional view similar to FIG. 2, showing an automatic balancing device according to a second preferred embodiment of the present invention.

FIG. 4 is a sectional view similar to FIG. 2, showing an automatic balancing device 20 according to a second preferred embodiment of the present invention. In this preferred embodiment and other preferred embodiments to be described later, substantially same parts as those in the first preferred embodiment are denoted by the same reference numerals, and the description thereof will be omitted to focus the discussion on different parts.

The automatic balancing device 20 includes an enclosure 23 having a plurality of plate-like projections 24 different in length from the plate-like projections 14 of the enclosure 13. In the enclosure 23 according to this preferred embodiment, the length of each plate-like projection 24 from an outer circumferential wall 23*b* of the enclosure 23 to a front end 24*a* of each plate-like projection 24 is set so that a part of a straight line L2 orthogonal to the straight line L1 at the front end 24*a* in the sheet plane of FIG. 4 passes through the magnet 17 at a position radially inside of an outer circumferential surface 17*a* of the magnet 17. In other words, the distance between the front end 24*a* of each plate-like projection 24 and the magnet 17 is set smaller than that in the first preferred embodiment, so that the balancer 11 can be returned to the magnet 17 more reliably.

Figure 5:
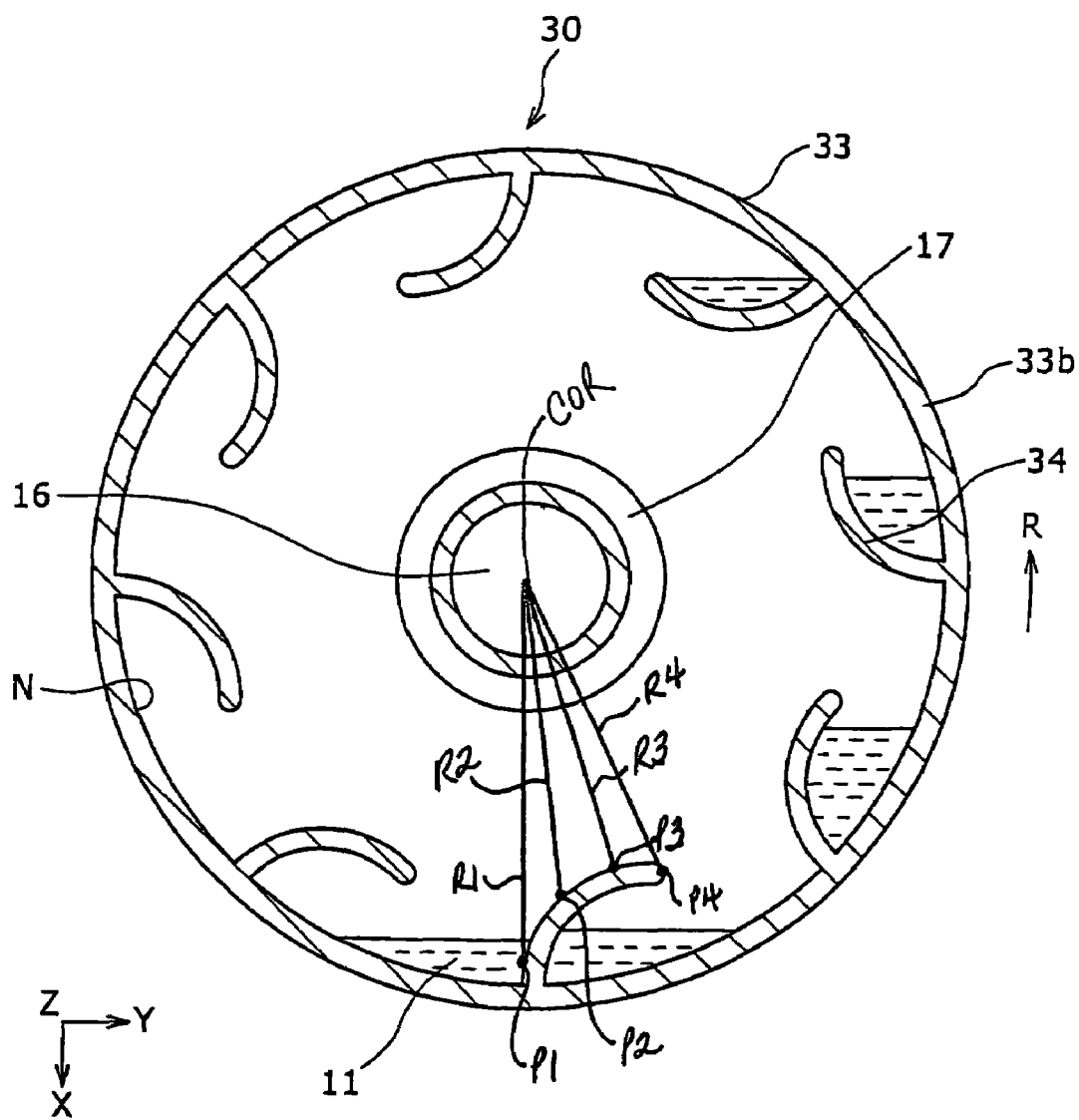
FIG. 5 is a sectional view similar to FIG. 2, showing an automatic balancing device according to a third preferred embodiment of the present invention.

FIG. 5 is a sectional view similar to FIG. 2, showing an automatic balancing device 30 according to a third preferred embodiment of the present invention.

The automatic balancing device 30 includes an enclosure 33 having a plurality of plate-like projections 34 different in shape from the plate-like projections 14 and 24. More specifically, each plate-like projection 34 projects from an outer circumferential wall 33*b* of the enclosure 33 toward the center of the enclosure 33 so as to be arcuately curved. Each plate-like projection 34 is curved in the same direction as the direction R of rotation of the enclosure 33. With this configuration, the balancer 11 can be lifted to a higher position by each plate-like projection 34 in the vertical position of the automatic balancing device 30, so that the balancer 11 can be returned to the original position on the magnet 17 more reliably.

In this preferred embodiment, the sectional shape of each plate-like projection 34 corresponds to a quarter of a circle. As a modification, the sectional shape of each plate-like projection 34 may be changed to one-sixth of a circle, for example. Further, the sectional shape of each plate-like projection 34 may be derived from an ellipse or a hyperbola. Further, it is preferable that the angle formed between each plate-like projection 34 and the inner surface N of the outer circumferential wall 33*b* of the enclosure 33 at the juncture therebetween may be suitably changed according to the length of each plate-like projection 34 or the curvature thereof, for example.

Figure 6:
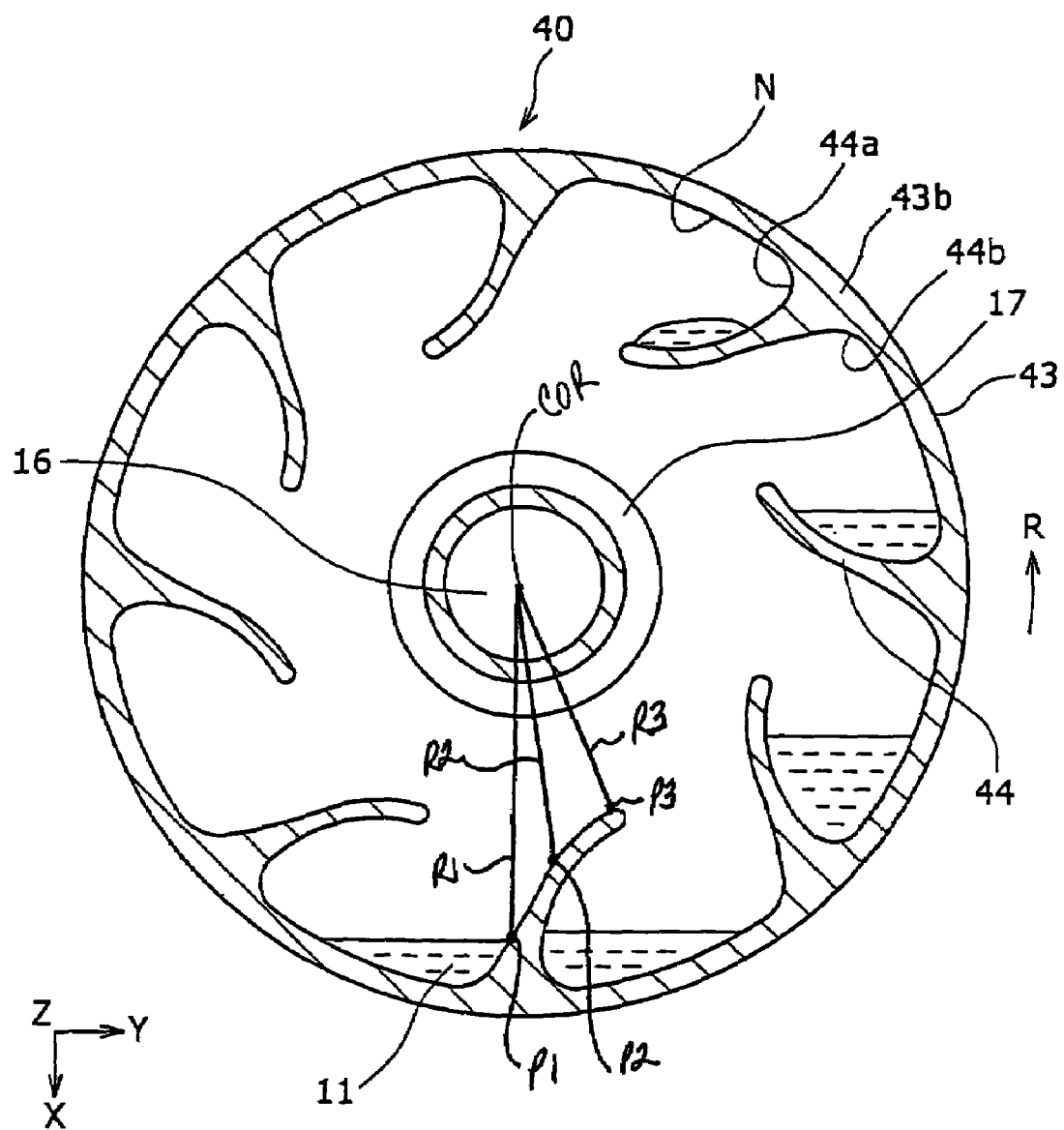
FIG. 6 is a sectional view similar to FIG. 2, showing an automatic balancing device according to a fourth preferred embodiment of the present invention.

FIG. 6 is a sectional view similar to FIG. 2, showing an automatic balancing device 40 according to a fourth preferred embodiment of the present invention.

The automatic balancing device 40 includes an enclosure 43 having a plurality of plate-like projections 44 projecting from an outer circumferential wall 43*b* of the enclosure 43 toward the center of the enclosure 43. Each plate-like projection 44 has an arcuate sectional shape and a pair of curved surfaces 44*a* and 44*b* at the juncture to the inner surface N of the outer circumferential wall 43*b*. In other words, no angle is formed between each plate-like projection 44 and the inner surface N of the outer circumferential wall 43*b*, but each plate-like projection 44 is smoothly connected through the curved surfaces 44*a* and 44*b* to the inner surface N of the outer circumferential wall 43*b*. The acuter the angle formed between each plate-like projection 44 and the outer circumferential wall 43*b*, the larger the force of attracting the balancer 11 between each plate-like projection 44 and the outer circumferential wall 43*b* due to the surface tension of the balancer 11. However, according to this preferred embodiment, each plate-like projection 44 has the curved surfaces 44*a* and 44*b* smoothly continuing to the outer circumferential wall 43*b*, so that the force of attracting the balancer 11 between each plate-like projection 44 and the outer circumferential wall 43*b* can be reduced. As a result, the balancer 11 can be efficiently returned to the original position on the magnet 17 without being left between each plate-like projection 44 and the outer circumferential wall 43*b*.

While each arcuate plate-like projection 44 has the curved surfaces 44*a* and 44*b* in this preferred embodiment, each straight plate-like projection 14 shown in FIG. 2 may have a pair of curved surfaces continuing to the outer circumferential wall 13*b*, for example. In other words, each plate-like projection 14 may be smoothly connected through the curved surfaces to the inner surface N of the outer circumferential wall 13*b*. Also, in this case, the balancer 11 can be efficiently returned to the original position on the magnet 17 without being left between each plate-like projection 14 and the outer circumferential wall 13*b*.

Figure 7:
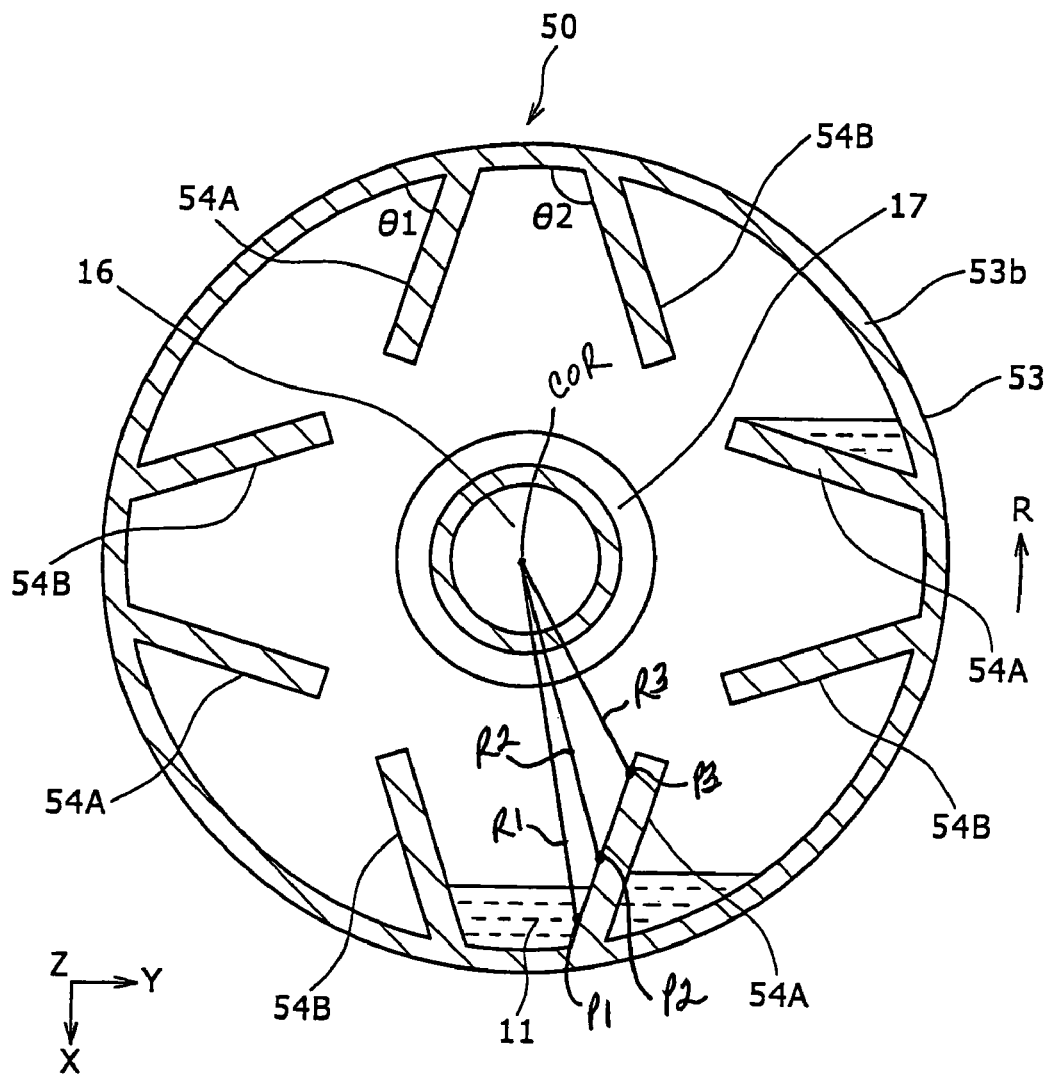
FIG. 7 is a sectional view similar to FIG. 2, showing an automatic balancing device according to a fifth preferred embodiment of the present invention.

FIG. 7 is a sectional view similar to FIG. 2, showing an automatic balancing device 50 according to a fifth preferred embodiment of the present invention.

The automatic balancing device 50 includes an enclosure 53 having a plurality of pairs of plate-like projections 54A and 54B. Each pair of plate-like projections 54A and 54B project from an outer circumferential wall 53*b* of the enclosure 53 at different angles. More specifically, each plate-like projection 54A projects straight at an angle θ1 from the outer circumferential wall 53b toward the center of the enclosure 53, and each plate-like projection 54B projects straight at an angle θ2 different from the angle θ1 from the outer circumferential wall 53b toward the center of the enclosure 53. All the plate-like projections 54A and 54B are arranged alternately in the circumferential direction of the enclosure 53.

According to this preferred embodiment, the balancer 11 can be returned to the magnet 17 irrespective of the rotational direction of the automatic balancing device 50. More specifically, when the automatic balancing device 50 is rotated in the direction R, the balancer 11 can be returned to the magnet 17 by each plate-like projection 54A toward the stop of rotation of the device 50, whereas when the device 50 is rotated in the direction opposite to the direction R, the balancer 11 can be returned to the magnet 17 by each plate-like projection 54B toward the stop of rotation of the device 50.

While the plate-like projections 54A and 54B are alternately arranged in this preferred embodiment, each pair of plate-like projections 54A and 54B may be composed of a plurality of first plate-like projections and a plurality of second plate-like projections different in angle of inclination from the first plate-like projections.

Figure 8:
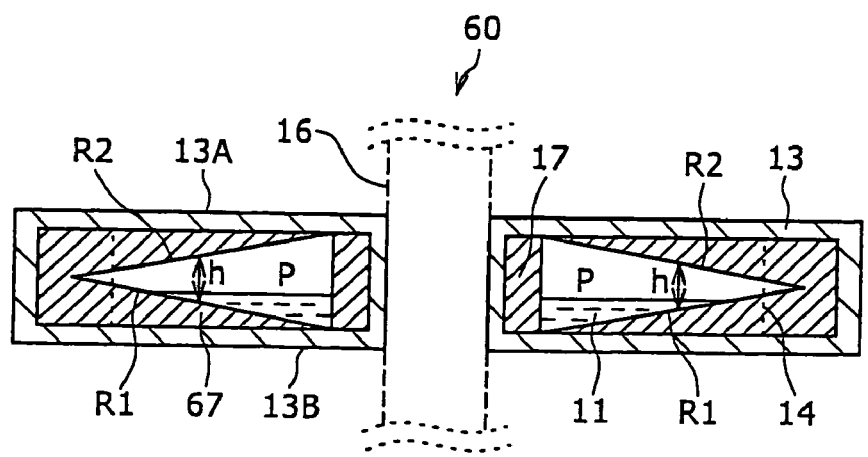
FIG. 8 is a sectional view of an automatic balancing device according to a sixth preferred embodiment of the present invention as taken along the axis of rotation of the automatic balancing device.

FIG. 8 is a sectional view of an automatic balancing device 60 according to a sixth preferred embodiment of the present invention as taken along the axis of rotation of the device 60.

The automatic balancing device 60 includes the enclosure 13 mentioned above with respect to FIGS. 1 and 2. A passage forming member 67 for forming a passage P for the balancer 11 is accommodated in the enclosure 13. The passage forming member 67 has an inclined surface R1 gradually approaching a lower surface 13B of the enclosure 13 from the outer circumferential side of the enclosure 13 toward the center thereof and an inclined surface R2 gradually approaching an upper surface 13A of the enclosure 13 from the outer circumferential side of the enclosure 13 toward the center thereof. These inclined surfaces R1 and R2 are formed over the periphery of the axis of rotation of the enclosure 13. Accordingly, even when the automatic balancing device 60 is in a horizontal position as shown in FIG. 8, the balancer 11 can be moved from the outer circumferential side of the enclosure 13 toward the center thereof due to its own weight by the passage P, i.e., by the inclined surface R1, thus returning of the balancer 11 to the magnet 17.

The angles of inclination of the inclined surfaces R1 and R2 are not limited to those shown in FIG. 8, but it is preferable that these angles may be suitably changed according to the characteristics of the balancer 11, the rotational speed of the motor 61, etc. Further, while the inclined surfaces R1 and R2 are plane in this preferred embodiment, they may be concave or convex. Also, in this case, a similar effect can be obtained.

The present invention is not limited to the above preferred embodiments, but various modifications may be made.

For example, the disk drive 70 in the first preferred embodiment may include the control section for controlling the rotational speed of the motor 61 to rotate the enclosure 13 immediately before loading the disk D or immediately after ejecting the disk D. The rotational speed of the motor 61 to be controlled by the control section in this case may be set lower than the rotational speed in recording a signal to the disk D or reproducing a signal from the disk D. More specifically, when receiving a disk loading signal as a trigger, the control section supplies a predetermined current to the motor 61 to thereby rotate the automatic balancing device 10 at a speed of 200 rpm or less or 100 rpm or less, thereby reliably returning the balancer 11 to the magnet 17. Thereafter, the disk D is placed on the turntable 65 by the user, and the loading of the disk D is performed. Accordingly, even when the balancer 11 has scattered from the magnet 17 because of unexpected shock or the like in the inoperative condition of an optical disk drive, the balancer 11 can be reliably returned to the magnet 17 before operating the motor 61.

In each preferred embodiment mentioned above, the magnet 17 is provided in the hollow portion G of the enclosure 13 near the center thereof. As a modification, the magnet 17 may be provided on the upper surface 13A or the lower surface 13B of the enclosure 13 near the center thereof in the preferred embodiment shown in FIG. 8 and the enclosure may be formed of a nonmagnetic material such as resin, provided that the balancer 11 can be retained near the center of the enclosure 13 in the inoperative condition of the disk drive 70. Also, in this case, the magnetic flux of the magnet 17 provided outside of the enclosure 13 reaches the inside of the enclosure 13, so that the balancer 11 can be retained through the enclosure 13 to the magnet 17.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An automatic balancing device comprising:
   a balancer made of a magnetic fluid;
   a rotatable enclosure having an outer circumferential wall and accommodating said balancer;
   a magnet provided near at least the center of rotation of said enclosure so as to be rotatable integrally with said enclosure; and
   a platelike projection projecting from said outer circumferential wall toward the center of rotation of said enclosure, at least a part of said platelike projection extending in a direction different from a radial direction of said enclosure at the juncture between said platelike projection and said outer circumferential wall,
   wherein all consecutive points disposed on each platelike projection commencing from the outer circumferential wall and toward the center of rotation of said enclosure are radially closer to the center of rotation relative to previous ones of the consecutive points, wherein each radial associated with and interconnecting each one of all of the consecutive points with the center of rotation is angularly offset from one another relative to the center of rotation and wherein all of the consecutive points are aligned relative to each other along a common straight line.

2. The automatic balancing device according to claim 1, wherein
   said platelike projection has a front end which becomes a most advanced end in respect of the rotation of said enclosure.

3. The automatic balancing device according to claim 1, wherein:
   said platelike projection has a front end present radially inside of said outer circumferential wall;
   said magnet has an annular shape substantially coaxial with said enclosure; and
   the length of a first straight line from said outer circumferential wall to said front end of said platelike projection is set so that a part of a second straight line orthogonal to said first straight line at said front end in a plane substantially perpendicular to the axis of rotation of said enclosure passes through said magnet at a position radially inside of the outer circumference of said magnet.

4. The automatic balancing device according to claim 1, wherein
said platelike projection comprises a first platelike projection projecting at a first angle from said outer circumferential wall toward the center of said enclosure and a second platelike projection projecting at a second angle different from said first angle from said outer circumferential wall toward the center of said enclosure.

5. An automatic balancing device comprising:
a balancer made of a magnetic fluid;
a rotatable enclosure having an outer circumferential wall and accommodating said balancer;
a magnet provided near at least the center of rotation of said enclosure so as to be rotatable integrally with said enclosure; and
a platelike projection projecting from said outer circumferential wall toward the center of rotation of said enclosure, at least a part of said platelike projection extending in a direction different from a radial direction of said enclosure at the juncture between said platelike projection and said outer circumferential wall,
wherein said enclosure has a passage for said balancer, said passage, as viewed in radial cross-section, expanding from the outer circumferential side of said enclosure toward the center of rotation of said enclosure.

6. A rotational driving device comprising:
a rotational drive section;
a balancer made of a magnetic fluid;
an enclosure having an outer circumferential wall and accommodating said balancer, said enclosure being rotatable by said rotational drive section;
a magnet provided near at least the center of rotation of said enclosure so as to be rotatable integrally with said enclosure; and
a platelike projection projecting from said outer circumferential wall toward the center of rotation of said enclosure, at least a part of said platelike projection extending in a direction different from a radial direction of said enclosure at the juncture between said platelike projection and said outer circumferential wall,
wherein all consecutive points disposed on each platelike projection commencing from the outer circumferential wall and toward the center of rotation of said enclosure are radially closer to the center of rotation relative to previous ones of the consecutive points, wherein each radial associated with and interconnecting each one of all of the consecutive points with the center of rotation is angularly offset from one another relative to the center of rotation and wherein all of the consecutive points are aligned relative to each other along a common straight line.

7. A disk drive comprising:
a rotational drive section for rotating a disk;
a balancer made of a magnetic fluid;
an enclosure having an outer circumferential wall and accommodating said balancer, said enclosure being rotatable by said rotational drive section;
a magnet provided near at least the center of rotation of said enclosure so as to be rotatable integrally with said enclosure;
a platelike projection projecting from said outer circumferential wall toward the center of rotation of said enclosure, at least a part of said platelike projection extending in a direction different from a radial direction of said enclosure at the juncture between said platelike projection and said outer circumferential wall; and
a control section for controlling said rotational drive section to rotate said enclosure immediately before loading said disk or immediately after ejecting said disk,
wherein all consecutive points disposed on each platelike projection commencing from the outer circumferential wall and toward the center of rotation of said enclosure are radially closer to the center of rotation relative to previous ones of the consecutive points, wherein each radial associated with and interconnecting each one of all of the consecutive points with the center of rotation is angularly offset from one another relative to the center of rotation and wherein all of the consecutive points are aligned relative to each other along a common straight line.

* * * * *